Figure 1:
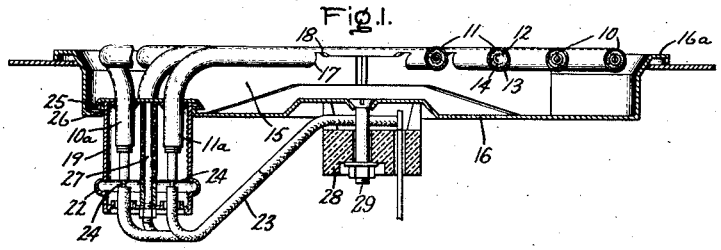

April 16, 1935.  R. CAUSSE  1,998,308

ELECTRIC HEATER

Filed Dec. 15, 1933  2 Sheets-Sheet 1

Inventor:
René Causse,
by Harry E. Dunham
His Attorney.

April 16, 1935.   R. CAUSSE   1,998,308
ELECTRIC HEATER
Filed Dec. 15, 1933   2 Sheets-Sheet 2
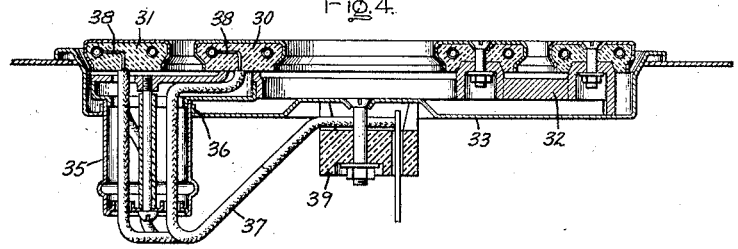
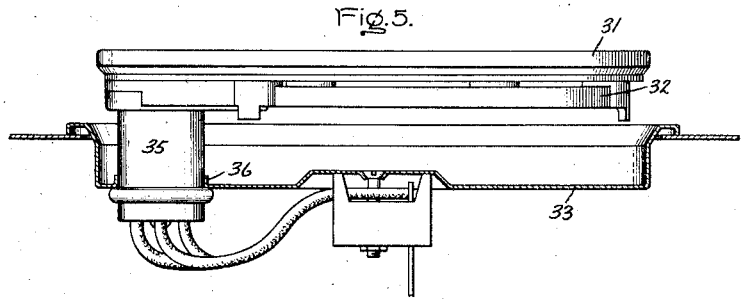
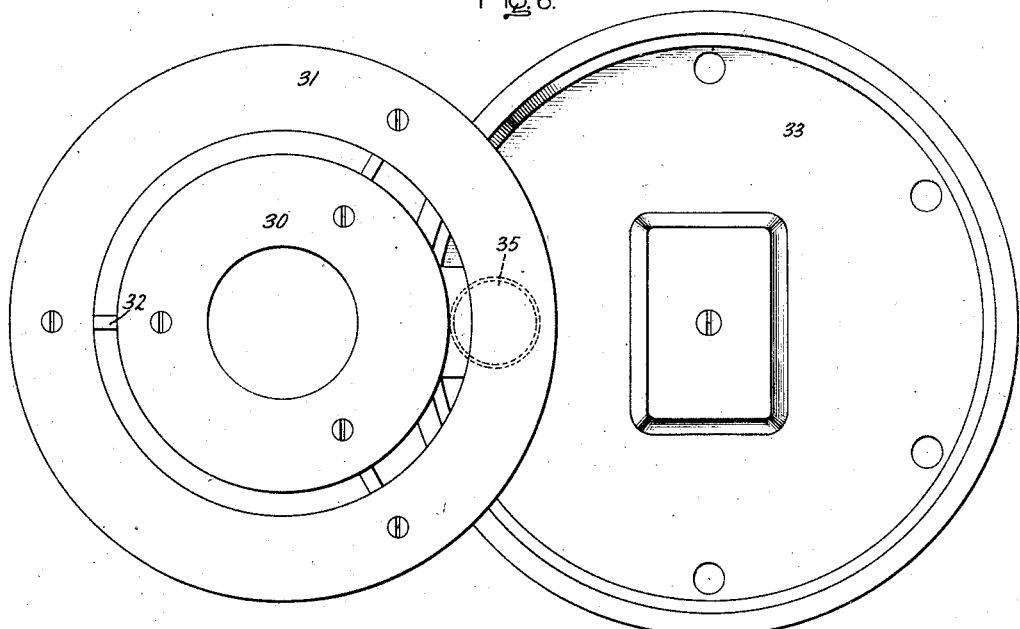
Inventor:
René Causse,
by Harry E. Dunham
His Attorney.

Patented Apr. 16, 1935

1,998,308

UNITED STATES PATENT OFFICE 1,998,308

ELECTRIC HEATER

René Causse, Lesquin, France, assignor to General Electric Company, a corporation of New York Application December 15, 1933, Serial No. 702,532
In France April 18, 1933

6 Claims. (Cl. 219—37)

This invention relates to electric heaters, more particularly to electrically heated hotplates, and it has for its object the provision of an improved heating device of this character.

It is frequently very difficult and even impossible to properly clean many of the heating plates which are now used in electric chafing-dishes, kitchen ranges, and like electric heating devices. Spilled food particles and other foreign substances collect in certain inaccessible parts of these plates and their containers, and not only soil them, but also impair them by weakening their insulation or by corroding them.

The arrangements which heretofore have been proposed to obviate these difficulties have not given entire satisfaction, for they frequently cause a rapid deterioration of the connections without, for that matter, making the cleaning much easier.

The present invention contemplates an improved heating device which permits rapid and easy cleaning, and moreover, which obviates any possibility of electric shock even though the plates are energized while being cleaned. This invention also contemplates the provision of means for preventing foreign substances, such as fatty or acid substances, from coming into contact with and deteriorating the heating resistances, the electrical supply conductors, and the connections between the supply conductors and the heating resistances. Moreover, hotplates in accordance with this invention are easily adapted to existing electric chafing dishes, kitchen ranges, and like heating devices, and can be substituted for the existing plates in these devices.

In accordance with this invention, the electric hotplate comprises a heating element consisting of an insulated resistance element in the form of a grid, and a relatively shallow pan or receptacle which receives the heating element. A mechanical connection is provided between the heating element and its receptacle arranged so as to provide for movement of the heating element from the receptacle to a plane substantially parallel with the receptacle, and also for rotary motion of the heating element in this plane to a position where the element uncovers substantially all of the inner surfaces of the receptacle. In one form of this invention, the pivotal connection comprises a cylindrical connector rigidly secured to the heating element and passed through an aperture provided for it in the bottom of the heating plate. The axis of the connector is arranged eccentrically with the central vertical axis of the pan. The connector is sufficiently long to permit the heating element to be moved upwardly out of the receptacle, and the eccentric arrangement between the axes of the pan and the connector are such that the heating element can be rotated to a position where it substantially completely uncovers the bottom surface of the pan. Preferably, the electrical supply connections for the heating element will be directed to the element through the cylindrical connector. The connector is provided with suitable baffle means for preventing foreign substances from falling into the connector and contacting the electrical conductors, or the connections between the conductors and the heating element.

Figure 2:
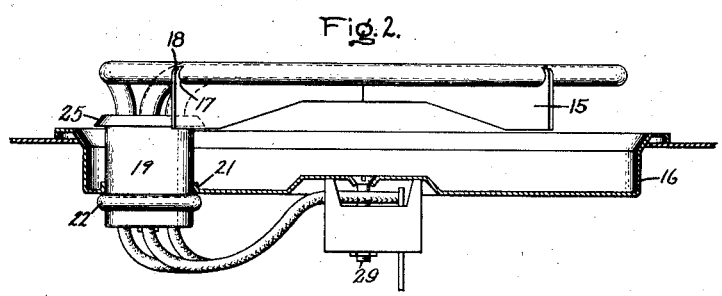
Figure 3:
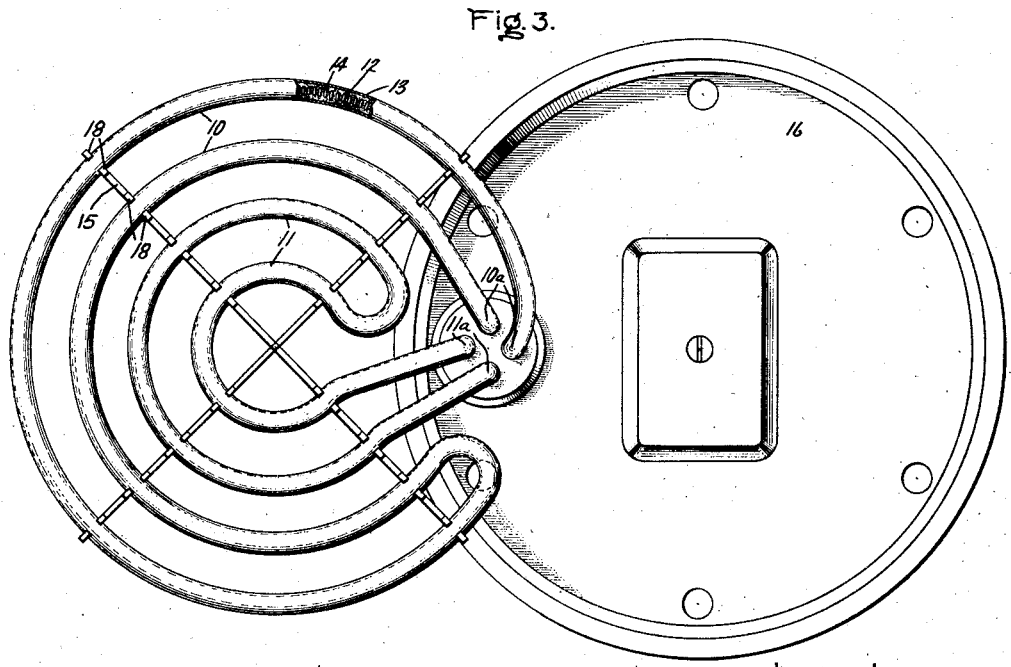

For a more complete understanding of this invention, reference should be had to the accompanying drawings in which Fig. 1 is a central vertical sectional view of an electric hotplate arranged in accordance with this invention; Fig. 2 is a view similar to Fig. 1, but showing only the receptacle for the heating element in section, and illustrating the heating element removed from its receptacle to a plane above the receptacle; Fig. 3 is a plan view of the hotplate of Figs. 1 and 2, but showing the heating element revolved in its elevated plane to a position whereby access can be had to the receptacle for cleaning purposes and the like; Figs. 4, 5 and 6 are views similar to Figs. 1, 2 and 3, respectively, but illustrating an electric hotplate of modified form arranged in accordance with this invention.

Referring more specifically to Figs. 1-3, inclusive, this invention is shown as applied to an electric hotplate comprising a heating grid which consists of two heating elements 10 and 11. These elements preferably will be of the sheathed type, such as described and claimed in the United States patent to C. C. Abbott, No. 1,367,341, dated February 1, 1921. Briefly, these elements comprise a helical resistance heating element 12 encased in a cylindrical metallic sheath 13. The heating element 12 is embedded in and supported in spaced relation with respect to the sheath by means of a suitably compacted, heat conducting, electrically insulating material 14, such as magnesium oxide.

As shown in Fig. 3, the heating element 10 is formed into a substantially circular convolution which embraces the heating element 11 which is similarly formed. The terminal portions 10a and 11a, respectively, of the two heating elements are located relatively close to each other adjacent the outer periphery of the heating element 10, as clearly shown in Fig. 3.

It will be observed that by reason of this arrangement, the two heating elements provide two concentric heating zones which can be utilized separately or simultaneously by controlling the energization of the heating elements in a manner well understood by those skilled in the art.

The two heating elements 10 and 11 are mounted upon a support 15 made of any suitable material, such as sheet steel, or cast iron. The heating elements are rigidly secured to the framework 15 in any suitable manner, but preferably will be arranged in recesses 17 provided for them in the upper edges of the framework and secured to the framework by means of arms or jaws 18 formed of the material of the framework on each side of the recesses and arranged to grip the opposite sides of the heating elements, as clearly shown in Figs. 2 and 3. The foregoing construction unites the heating elements and framework into a rigid unitary structure.

The support 15 rests on the bottom of a relatively shallow dish or pan-like metallic receptacle 16. As shown in Fig. 1, the framework 15 supports the heating elements in an elevated position so that the heating grid projects somewhat above the side walls of the receptacle, whereby articles placed upon the hotplate rest directly on the heating grid out of contact with the side walls. Preferably, the heating elements 10 and 11 will be arranged so that when they are supported on their framework 15, as shown in Fig. 1, they will cover an area substantially coextensive with the entire area of the bottom wall of the receptacle.

The terminal ends 10a and 11a of the two heating elements respectively are turned downwardly, as shown in Fig. 1, and are received in a cylindrical connector member 19. This connector member, as shown, is positioned adjacent the outer edge of the heating grid and is rigidly secured to the grid in a manner to be described presently.

The connector member 19 functions to mechanically connect the heating elements to the pan 16 so that these elements can be elevated from the pan to a plane above it and substantially parallel with the bottom of the pan, as shown in Fig. 2, and further, so that the elements can be rotated in this plane from the position shown in Fig. 2 to the position shown in Fig. 3 so as to expose substantially all of the inner surfaces of the pan.

For this purpose, the bottom of the pan 16 is provided with an aperture 21 for receiving the connector 19. This aperture 21 is sufficiently large to permit the connector to be slid freely through the aperture. The connector is provided with a bead 22 at its lower end arranged to limit the upward travel of the connector 19 through the aperture.

Electrical supply conductors 23 for the heating elements are directed up into the connector from the bottom of the pan. These conductors are secured to the terminals 24 of the heaters in any suitable well-known manner.

A baffle member 25 is secured to the upper end of the connector member arranged to prevent liquids and other foreign bodies from entering into the connector and contacting the electrical conductors 23 or the connections between the conductors and the heating elements.

The baffle member 25 functions also to secure the connector to the heating elements. As shown, the baffle is provided with a series of apertures through which the terminal ends 10a and 11a of the elements pass. The baffle is secured to these ends by means of welded or similar joints 26. The connector is secured to the baffle by means of a suitable bolt 27.

It will be observed that the vertical axis of the connector member 19 is eccentrically arranged with reference to the vertical axis of the pan so that when the heating element is moved upwardly from the pan from its position (Fig. 1) to its elevated position (Fig. 2) and then rotated on the axis of the connector to its position shown in Fig. 3, it will substantially uncover all of the inner parts of the pan, whereby both the pan and the heating element can be cleaned conveniently.

The supply conductors 23 terminate in a terminal plate 28 which is fastened, as shown, to the bottom of the pan 16 by means of a suitable screw 29. The conductors, it will be observed, are of such a length that they can follow the motions of the connector up through the pan without straining the conductors.

It will be observed, in view of the fact that the resistance heating elements 12 are completely enclosed in metallic sheaths and the connections between the supply conductors and the heating elements are enclosed in the conductor 19, that no "live" parts of the heater are exposed. Thus, even though the attendant cleans the heating elements and receptacle when the elements are energized, it is practically impossible for the attendant to come in contact with any "live" part of the apparatus.

The pan 16 is provided at its upper edge with a flange 16a so that the container lends itself readily to electric stoves, and electric chafing-dishes commonly found in kitchens.

In Figs. 4-6 inclusive, a modified form of this invention is shown. This plate comprises concentrically arranged substantially flat annular heating elements 30 and 31, rather than the coiled elements 10 and 11 shown in Figs. 1-3. These elements 30 and 31 are supported upon a suitable framework 32 which in turn rests upon the bottom of the receptacle 33 provided for the heating elements so as to support the elements in an elevated position, as clearly shown in Fig. 4. The heating elements are mechanically connected with the pan by means of a connector member 35 which is received in an aperture 36 provided for it in the receptacle. The connector member 35 has substantially the same construction as has the connector member 19 of Figs. 1-3, and is arranged in substantially the same manner so that the heating elements 30 and 31 can be moved upwardly from the pan 33 from the position shown in Fig. 4 to the position shown in Fig. 5, and then rotated on the connector from the position shown in Fig. 5 to the position shown in Fig. 6 to expose substantially all parts of the heating elements and the pan.

Suitable connection supply cables 37 are directed up through the connector member 35 to the terminals 38 of the heating elements. These cables terminate in a terminal plate 39 secured to the bottom of the pan 33.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An electric hotplate comprising a heating element, a receptacle having side walls and a bottom wall receiving said heating element and a pivotal connecting member positioned off the center of said receptacle mechanically connecting said heating element to said receptacle and providing for limited movement of said heating element out of said receptacle to a plane substantially parallel with said receptacle, and for rotation of said heating element in said plane so as to uncover the bottom wall of said receptacle.

2. An electric hotplate comprising a heating element, a pan-like receptacle having a bottom wall and side walls extending upwardly therefrom receiving said heating element so that it rests upon said bottom wall within said side walls, and a pivotal connection between said heating element and said receptacle located eccentrically to the central vertical axis of said receptacle, and providing for limited vertical movement of said heating element out of said receptacle to a plane above said side walls and substantially parallel with the bottom wall of said receptacle, and for rotary motion of said heating element in said plane to a position where it substantially uncovers the entire bottom wall of said receptacle.

3. An electric hotplate comprising a heating element of grid formation, a relatively shallow flat receptacle having a bottom wall and side walls extending upwardly therefrom receiving said heating element, a cylindrical connector member secured to said heating element and received in an aperture provided for it in the bottom wall of said receptacle, the vertical axis of said connector being substantially perpendicular to said bottom wall and eccentrically positioned with respect to the vertical axis of said receptacle, said connector member providing for limited vertical movement of said heating element out of said receptacle to a plane above the side walls of said receptacle and substantially parallel with its bottom wall, and for rotary movement of said heating element in said plane to a position uncovering substantially all of said bottom wall, and electrical supply conductors for said heating element passing through said aperture in said bottom wall and said cylindrical connector to said heating element.

4. An electric hotplate comprising a relatively shallow flat cylindrical receptacle, a sheathed heating element formed into a plurality of convolutions defining a grid having substantially the same contour as said receptacle and when fitted into said receptacle being substantially coextensive with the entire area of the bottom wall of said receptacle, a framework resting on said bottom wall supporting said heating element in an elevated position so that it projects somewhat above the side wall of said receptacle, means rigidly securing said heating element to said framework so as to unite said members into a rigid unitary structure, an elongated cylindrical connector rigidly secured to said unitary structure adjacent one edge thereof, said receptacle being provided with an aperture adjacent one of its edges for receiving said cylindrical connector, said connector being arranged to slide freely in said aperture relative to said receptacle so that said unitary structure can be moved from said receptacle to a plane above its side wall, and can be rotated in said plane on said connector as an axis, means on said connector for engaging said receptacle to limit its movement relative to said receptacle, terminals for said heating element located in said connector, electrical supply conductors for said heating element passed into said connector where they are connected with said terminals, and a baffle above said connector arranged to prevent foreign matters from entering said connector.

5. An electric hotplate comprising a heating element of grid formation, a relatively shallow flat receptacle having a bottom wall and side walls extending upwardly therefrom receiving said heating element with said element embraced by said side walls, a cylindrical connector secured to said heating element and received in an aperture provided for it in the bottom of the receptacle, the vertical axis of said connector being perpendicular to the bottom wall of said receptacle, said connector providing for limited vertical movement of said heating element out of said receptacle to a plane above the side wall of said receptacle and substantially parallel with its bottom wall, and for rotary movement of said heating element in said plane, electrical supply conductors for said heating element passing through said cylindrical connector to said heating element and a terminal member for said conductors secured to the bottom wall of said receptacle.

6. An electric hotplate comprising a plurality of concentrically arranged annular heating elements, a frame supporting said heating elements, a pan-like receptacle having a bottom wall and side walls extending upwardly therefrom receiving said heating elements and frame within said side walls and a pivotal connection between said heating elements and frame and said receptacle located eccentrically to the central vertical axis of said receptacle and providing for limited movement of said heating elements and frame out of said receptacle to a plane substantially parallel with the bottom wall of said receptacle and for rotary motion of said heating elements and frame in said plane.

R. CAUSSE.